United States Patent [19]

Peiffer et al.

[11] Patent Number: 5,496,600

[45] Date of Patent: Mar. 5, 1996

[54] MATTE BIAXIALLY ORIENTED, MULTILAYER POLYPROPYLENE FILM AND THE USE THEREOF

[75] Inventors: Herbert Peiffer, Mainz; Ursula Murschall, Nierstein; Gunter Schloegl, Kelkheim, all of Germany

[73] Assignee: Hoechst Aktiengesellschaft, Frankfurt am Main, Germany

[21] Appl. No.: 231,761

[22] Filed: Apr. 25, 1994

[30] Foreign Application Priority Data

Apr. 27, 1993 [DE] Germany .................. 43 13 430.0

[51] Int. Cl.$^6$ ........................................... B29D 22/00
[52] U.S. Cl. .................. 428/35.7; 428/220; 428/349; 428/910; 525/240; 156/244.11
[58] Field of Search .................. 428/516, 35.7, 428/349, 910, 220; 525/240; 156/244.11

[56] References Cited

U.S. PATENT DOCUMENTS

| | | | |
|---|---|---|---|
| 4,578,316 | 3/1986 | Clauson et al. | 428/516 |
| 4,622,237 | 11/1986 | Lori | 427/40 |
| 4,652,489 | 3/1987 | Crass | 428/337 |
| 4,786,533 | 11/1988 | Crass | 428/13 |
| 4,855,187 | 8/1989 | Osgood, Jr. et al. | 428/516 |
| 4,921,749 | 5/1990 | Bossaert et al. | 428/216 |
| 4,960,637 | 10/1990 | Biczenczuk | 428/314.4 |

FOREIGN PATENT DOCUMENTS

| | | |
|---|---|---|
| 2092773 | 4/1992 | Canada . |
| 0079520 | 5/1983 | European Pat. Off. . |
| 0236945 | 9/1987 | European Pat. Off. . |
| 288227 | 10/1988 | European Pat. Off. . |
| 0432452 | 6/1991 | European Pat. Off. . |
| 0479101 | 4/1992 | European Pat. Off. . |
| 4135096 | 4/1993 | Germany . |
| 2201407 | 9/1988 | United Kingdom . |

OTHER PUBLICATIONS

Guenther Kuehne, "Packaging Using Plastics", Carl-Hanser-Verlag, Munich, p. 63, 1974.

Ullmanns, Encyklopadie der technischen Chemis, 4th ed., vol. 12, Fugizide bis Holzwerkstoffe. pp. 525–555, 1976.

Patent Abstracts of Japan, vol. 16, No. 306 (M–1276), Jul. 6, 1992 (abstract of JP–A–04 086 260, published Mar. 18, 1992).

Derwent Publications, Ltd., AN 91–298804, (abstract of JP–A–3 197 541, published Aug. 28, 1991).

*Primary Examiner*—Edith Buffalow
*Attorney, Agent, or Firm*—Foley & Lardner

[57] ABSTRACT

The invention relates to a multilayer polypropylene film which contains at least one base layer containing polypropylene or a polypropylene mixture and resin, and at least one outer layer which contains a mixture or a blend of two components I and II. Component I essentially comprises a propylene homopolymer or a copolymer of ethylene and propylene or ethylene and butylene or propylene and butylene or ethylene and another α-olefin having 5 to 10 carbon atoms or propylene and another α-olefin having 5 to 10 carbon atoms or a terpolymer of ethylene and propylene and butylene or ethylene and propylene and another α-olefin having 5 to 10 carbon atoms or a mixture of two or more of the homopolymers, copolymers and terpolymers or a blend of two or more of the homopolymers, copolymers and terpolymers, if desired mixed with one or more of the homopolymers, copolymers and terpolymers. Component II essentially contains an HDPE or a blend of two components A and B. Blend component A is essentially an HDPE. Blend component B is essentially a propylene homopolymer or a copolymer of ethylene and propylene or ethylene and butylene or propylene and butylene or ethylene and another α-olefin having 5 to 10 carbon atoms or propylene and another α-olefin having 5 to 10 carbon atoms or a terpolymer of ethylene and propylene and butylene or ethylene and propylene and another α-olefin having 5 to 10 carbon atoms or a mixture of two or more of the homopolymers, copolymers and terpolymers or a blend of two or more of the homopolymers, copolymers and terpolymers. The film is used in twist wrapping.

20 Claims, No Drawings

MATTE BIAXIALLY ORIENTED, MULTILAYER POLYPROPYLENE FILM AND THE USE THEREOF

BACKGROUND OF THE INVENTION

1. Field of the Invention

The invention relates to a multilayer polypropylene film which comprises at least one base layer containing a propylene polymer or a propylene polymer mixture, and resin, and at least one outer layer which comprises a mixture or a blend of two polymer components.

The film according to the invention is distinguished by a characteristic matte surface or appearance and good twist behavior.

The invention furthermore relates to a process for the production of the multilayer film and to the use of the film.

2. Description of Related Art

A particular type full wrapping closure for the purpose of packaging is twist wrapping. This packaging method is particularly known in the full wrapping of relatively small objects. This type of packaging is frequently preferred for round or virtually round articles such as candy, bottles, candles, roll-packed confectionery, bars of chocolate and marzipan, Easter eggs or the like.

The requirements for twist wrapping is that it must not tear at the twist points, but must also not be so rigid that no shrinkage or crumpling occurs during the twisting operation. According to the known art, twist wrappings for candy are made predominantly from cellophane, i.e., regenerated cellulose, un-oriented polypropylene or PVC film, cf. "Verpacken mit Kunststoffen" [Packaging using Plastics] by Günther Kühne, published 1974, Carl-Hanser-Verlag, Munich, page 63.

Very recently, polypropylene films which have been biaxially oriented to different extents have been proposed for use in twist wrapping.

EP-A-0 479 101 relates to a multilayer, highly transparent, biaxially oriented polypropylene film having very good twist properties which is particularly suitable for twist wrapping. The film has a base layer comprising from 70 to 95% by weight of polypropylene and from 5 to 30% by weight of a low-molecular-weight hydrocarbon resin having a softening point from 130° to 180° C., and the outer layers contain an antiblocking agent having a mean particle size from 2 to 5 μm and possibly polydimethylsiloxane. The outer layers have a maximum thickness of 0.5 μm. The films are furthermore distinguished by good mechanical properties, which are equally good in both the longitudinal and transverse direction. The film has balanced orientation.

EP-A-0 432 452 relates to a transparent twist-wrapping film made from polypropylene which has been monoaxially oriented and has a permanent set of greater than 45% perpendicular to the orientation direction. If desired, the film can be provided with one or more outer layer(s) made from conventional outer-layer materials.

DE-A-35 35 472 describes a film which is also highly suitable for twist wrapping. The addition of siloxane and antiblocking agents to the outer layers gives the film the desired processing properties on automatic, high-speed twist-wrapping machines. The film has the disadvantage of a relatively high resin content, which is necessary for the good twist-wrapping properties. An example given therein is 25% by weight. This high resin content makes the film significantly more expensive.

Known twist-wrapping films have unsatisfactory appearance, processing properties and in particular scratch resistance. Twist-wrapping films having a conventional base layer and a conventional ethylene ($C_2$)/propylene ($C_3$)-copolymer outer layer frequently exhibit cloudy structures or optical inhomogeneities.

German Patent Application P 41 35 096.0 discloses multilayer polyolefin films comprising a polypropylene base layer and an outer layer made from an HDPE blend. This HDPE blend comprises HDPE and copolymers and/or terpolymers made from α-olefins and, if desired, polypropylene. The outer layer of the multilayer film has minimum sheen and maximum haze, giving the film a characteristic matte appearance.

U.S. Pat. No. 4,578,316 discloses a biaxially oriented multilayer polyolefin film whose base layer comprises a polypropylene homopolymer and whose outer layer comprises a blend of polypropylene and MDPE and/or HDPE. This polyolefin film has a low coefficient of friction together with a readily wettable surface. However, this film also has excellent optical transparency.

WO 89/10839 discloses multilayer polyolefin films whose base layer comprises a propylene polymer and whose outer layers comprise either HDPE or an ethylene-propylene copolymer or polypropylene. The film is stretched under particular temperature conditions. It has a low coefficient of friction and good wettability, but simultaneously also has high sheen and low haze.

EP-A-0 367 613 discloses a multilayer film comprising a vacuole-containing polypropylene base layer and an inscribable outer layer which contains a first polymer having a melt flow index of $\leq 1$ g/10 min and a second polymer which is incompatible with said first polymer. Incompatible being defined as the polymers being present as separate phases. An example given of the first polymer is an HDPE having a density from 0.92 to 0.97 $g/cm^3$. The incompatible polymer is polypropylene or a copolymer of propylene or a terpolymer of propylene. The film disclosed has an opaque appearance, i.e. it is essentially non-transparent to light. It is disclosed that the film acquires a matte appearance if it is provided with a print. It is additionally preferred to incorporate a filler such as $SiO_2$ into the outer layer, to improve the inscribability. The $SiO_2$-containing outer layer is simultaneously very matte, giving the film a paper-like appearance. The film disclosed has a density of 0.69 $g/cm^3$. The matte, $SiO_2$-containing surface proves to be unsatisfactory on printing. The color is foggy and does not have a uniform appearance. This foggy color is attributed to inhomogeneities which, due to their opacity, do not prominently appear in the film itself, but come out during printing. The printed films are spotty and are not accepted by a film processor.

Films with an HDPE-modified outer layer known from the prior art are unsuitable as twist-wrapping films due to their mechanical properties. In addition, the films have an unsatisfactory appearance.

SUMMARY OF THE INVENTION

One object of the present invention is to provide a multilayer film which is suitable for twist wrapping and has a matte appearance on at least one surface and at the same time has good scratch resistance. The sheen of the surface(s) should be optimized with respect to the desired matte characteristic. At the same time, a homogeneous film appearance without interfering spots or streaks and without a cloud structure is important. In addition, a uniform appearance of the print is required. Another object of the present invention is to provide a film which also has good twist behavior for twist wrapping and good running properties.

Another object of the present invention is to provide a coextrusion process for the production of the multilayer film. Still another object of the present invention is to provide a method for twist wrapping an article with the multilayer film. Yet another object of the present invention is to provide an article wrapped by the multilayer film.

In accomplishing the foregoing objectives, there has been provided according to one aspect of the present invention a multilayer polypropylene film having at least one matte surface which comprises at least one base layer containing a propylene polymer or a propylene polymer mixture, and resin, and at least one outer layer which comprises a mixture or a blend of two components I and II.

Component I of the mixture or blend is a propylene homopolymer or a copolymer of α-olefins having 2 to 10 carbon atoms or a terpolymer of α-olefins having 2 to 10 carbon atoms or a mixture of two or more of said homopolymers, copolymers and terpolymers or a blend of two or more of said homopolymers, copolymers and terpolymers.

Component II of the mixture or blend is a high-density polyethylene (HDPE) or a blend of HDPE and one or more further polymers selected from the group consisting of propylene homopolymers, copolymers of α-olefins having 2 to 10 carbon atoms, terpolymers of α-olefins having 2 to 10 carbon atoms, and a blend of copolymers and terpolymers of α-olefins having 2 to 10 carbon atoms.

In a preferred embodiment, component I is selected from the group consisting of a propylene homopolymer a copolymer of ethylene and propylene, a copolymer of ethylene and butylene, a copolymer of propylene and butylene, a copolymer of ethylene and another α-olefin having 5 to 10 carbon atoms, a terpolymer of ethylene and propylene and another α-olefin having 5 to 10 carbon atoms, a copolymer of propylene and another α-olefin having 5 to 10 carbon atoms, mixtures or blends thereof, and a blend of two or more of said homopolymers, copolymers and terpolymers, mixed with one or more of said homopolymers, copolymers and terpolymers.

Component II is selected from the group consisting of an HDPE and a blend of two components A and B, where blend component A is preferably
an HDPE and blend component B is selected from the group consisting of
a propylene homopolymer,
a copolymer of ethylene and propylene,
a copolymer of ethylene and butylene,
a copolymer of propylene and butylene,
a copolymer of ethylene and another α-olefin having 5 to 10 carbon atoms,
a copolymer of propylene and another α-olefin having 5 to 10 carbon atoms,
a terpolymer of ethylene and propylene and butylene,
a terpolymer of ethylene and propylene and another α-olefin having 5 to 10 carbon atoms, and
mixtures or blends thereof.

Preferably, the resin has a softening point from about 80° to 180° C. and the resin is added to the base layer in an amount from about 5 to 40% by weight based on the weight of the base layer.

In another preferred embodiment, the multilayer film has a permanent set of greater than about 50%, in the longitudinal and transverse directions and the multilayer film has approximately isotropic mechanical properties.

Another aspect of the present invention provides a process for the production of the multilayer polypropylene film, comprising the steps of coextruding the melts corresponding to the individual layers of the film through a flat-film die, taking the coextruded film off over a take-off roll whose temperature is between about 40° and 100° C., biaxially stretching the film at a longitudinal stretching ratio of about 5.5:1 to 9:1 and a transverse stretching ratio of about 6:1 to 8:1, heat-setting the biaxially stretched film, optionally corona-treating and subsequently winding the film up.

Still another aspect of the present invention provides a process for packaging an article, comprising the steps of wrapping an article at lest in part with the film followed by twisting the film around the article.

Yet another aspect of the present invention provides a packaged article, comprising the multilayer film surrounding at least in part an article.

Further objects, features and advantages of the invention will become apparent to persons skilled in the art from the detailed description of preferred embodiments that follows.

DETAILED DESCRIPTION OF THE PREFERRED EMBODIMENTS

The present invention comprises a matte, multilayer film of the generic type mentioned above, where component I of the outer layer preferably comprises a propylene homopolymer or a copolymer of
ethylene and propylene or
ethylene and butylene or
propylene and butylene or
ethylene and another α-olefin having 5 to 10 carbon atoms or
propylene and another α-olefin having 5 to 10 carbon atoms or a terpolymer of
ethylene and propylene and butylene or
ethylene and propylene and another α-olefin having 5 to 10 carbon atoms or a mixture of two or more of said homopolymers, copolymers and terpolymers or a blend of two or more of said homopolymers, copolymers and terpolymers, if desired mixed with one or more of said homopolymers, copolymers and terpolymers.

Component II preferably comprises an HDPE or a blend of two blend components A and B, where blend component A is preferably
an HDPE and blend component B is preferably
a propylene homopolymer or
a copolymer of
ethylene and propylene or
ethylene and butylene or
propylene and butylene or
ethylene and another α-olefin having 5 to 10 carbon atoms or
propylene and another α-olefin having 5 to 10 carbon atoms or a terpolymer of
ethylene and propylene and butylene or
ethylene and propylene and another α-olefin having 5 to 10 carbon atoms or
a mixture of two or more of said homopolymers, copolymers and terpolymers or
a blend of two or more of said homopolymers, copolymers and terpolymers.

For the purposes of the present invention, mixtures are defined as mechanical mixtures prepared from the individual components. Generally, the individual constituents are combined as small compression moldings, for example lenticular, spherical or rod-shaped granules, and mechanically mixed using a suitable vibrating device.

For the purposes of the present invention, a blend is an alloy-like compound of the individual components which cannot be re-separated into the original constituents. A blend has similar properties to a homogeneous material and can be characterized correspondingly by suitable parameters.

Films according to the invention prepared from a mixture of polymers are characterized by a less homogeneous appearance than films prepared from polymer blends.

The base layer of the multilayer film according to the present invention essentially comprises a propylene polymer or a propylene polymer mixture, and a resin.

The propylene polymer of the base layer comprises predominantly (at least about 90%) propylene and has a melting point from about 140° C. or above, preferably from about 150° to 170° C. Isotactic homopolypropylene having an n-heptane-soluble content of about 6% by weight or less, based on the isotactic homopolypropylene, copolymers of ethylene and propylene having an ethylene content of about 10% by weight or less, copolymers of propylene with $C_4$–$C_8$-α-olefins having an α-olefin content of about 10% by weight or less are preferred propylene polymers for the base layer. Isotactic homopolypropylene is particularly preferred. The percentages by weight stated relate to the particular copolymer. The propylene polymer of the base layer generally has a melt flow index from about 0.5 g/10 min to 8 g/10 min, preferably from about 2 g/10 min to 5 g/10 min at 230° C. and a force of 21.6N (DIN 53 735).

The propylene polymer employed in the base layer may be partially degraded by addition of organic peroxides. A measure of the degree of degradation of the polymer is the degradation factor A, which gives the relative change in the melt flow index, measured in accordance with DIN 53 735, of the propylene polymer, based on the starting polymer.

$$A = \frac{MFI_2}{MFI_1}$$

$MFI_1$=melt flow index of the propylene polymer before addition of the organic peroxide
$MFI_2$=melt flow index of the propylene polymer degraded by peroxide.

In general, the degradation factor A of the propylene polymer employed is in the range from about 3 to 15, preferably from about 6 to 10.

Particularly preferred organic peroxides are dialkyl peroxides, where the term alkyl radical is defined as a conventional saturated, straight-chain or branched lower alkyl radical having up to six carbon atoms. Particular preference is given to 2,5-dimethyl-2,5-di(t-butylperoxy)hexane and di-t-butyl peroxide.

The base layer of the film according to the invention contains a resin, generally in an amount from about 5 to 40% by weight, preferably from about 10 to 40% by weight, more preferably from about 15 to 35% by weight, based on the weight of the base layer. Preferred resins are low-molecular-weight resins, particularly hydrocarbon resins. The hydrocarbon resins may be partially or fully hydrogenated. Suitable resins are basically synthetic resins or resins of natural origin. It has proven particularly advantageous to employ resins having a softening point of about ≧80° C. (measured in accordance with DIN 1995-U4 or ASTM E-28), preferably those having a softening point from about 100° to 180° C., more preferably, from about 120° to 160° C. The resin is preferably incorporated into the film in the form of a masterbatch, which is introduced into the extruder (for example, a single-screw or cascade extruder). Examples of conventional masterbatches are those containing from about 30 to 70% by weight, preferably about 50% by weight, of propylene homopolymer and from about 70 to 30% by weight, preferably about 50% by weight, of hydrocarbon resin. The data in percent by weight relate to the total weight of propylene polymer and hydrocarbon resin.

Of the numerous resins, hydrocarbon resins are preferred, particularly in the form of petroleum resins, styrene resins, cyclopentadiene resins and terpene resins (these resins are described in Ullmanns Encyklopädie der techn. Chemie [Ullmann's Encyclopedia of Industrial Chemistry], 4th Edition, Volume 12, pages 525 to 555).

The petroleum resins are those hydrocarbon resins prepared by polymerization of deep-decomposed petroleum materials in the presence of a catalyst. These petroleum materials usually contain a mixture of resin-forming substances, such as styrene, methylstyrene, vinyltoluene, indene, methylindene, butadiene, isoprene, piperylene and pentylene. The styrene resins are low-molecular-weight homopolymers of styrene or copolymers of styrene with other monomers such as methylstyrene, vinyltoluene and butadiene. The cyclopentadiene resins are cyclopentadiene homopolymers or cyclopentadiene copolymers obtained from coal tar distillates and fractionated petroleum gas. These resins are prepared by keeping the materials containing cyclopentadiene at high temperature for long periods of time. Depending on the reaction temperature, dimers, trimers or oligomers can be obtained.

The terpene resins are polymers of terpenes, i.e. hydrocarbons of the formula $C_{10}H_{16}$, which are present in virtually all essential oils or oil-containing resins from plants. The terpine resins are also phenol-modified terpene resins. Specific examples of terpenes which may be mentioned are pinene, α-pinene, dipentene, limonene, myrcene, camphene and similar terpenes.

Hydrocarbon resins employed are also styrene homopolymers, styrene copolymers, cyclopentadiene homopolymers, cyclopentadiene copolymers and/or terpene polymers. These hydrocarbon resins have a softening point above about 100° C. (in the case of unsaturated polymers, the hydrogenated product is preferred). Particular preference is given to cyclopentadiene polymers having a softening point of about 140° C. or above in the base layer.

The hydrocarbon resins can also be so-called modified hydrocarbon resins. The modification is generally carried out by reaction of the raw materials before the polymerization, by the introduction of specific monomers or by reaction of the polymerized product, particularly by hydrogenation or partial hydrogenation.

At least one outer layer of the multilayer film according to the present invention comprises a mixture or a blend of two components I and II described above and set forth in greater detail below. If desired, additives may also be present in the outer layer.

Component I of the outer layer mixture or of the blend preferably comprises a propylene homopolymer or a copolymer of
ethylene and propylene or
ethylene and butylene or
propylene and butylene or
ethylene and another α-olefin having 5 to 10 carbon atoms or
propylene and another α-olefin having 5 to 10 carbon atoms or a terpolymer of
ethylene and propylene and butylene or
ethylene and propylene and another α-olefin having 5 to 10 carbon atoms or a mixture of two or more of said homopolymers, copolymers and terpolymers or a blend of two or more of said homopolymers, copolymers and terpolymers, if desired mixed with one or more of said homopolymers, copolymers and terpolymers.

In a preferred embodiment, component I advantageously comprises a propylene homopolymer or a copolymer of
ethylene and propylene or
ethylene and 1-butylene or
propylene and 1-butylene or a terpolymer of
ethylene and propylene and 1-butylene or a mixture of two or more of said homopolymers, copolymers and terpolymers or a blend of two or more of said homopolymers, copolymers and terpolymers, if desired mixed with one or more of said homopolymers, copolymers and terpolymers.

Particular preference is given to propylene homopolymers or random ethylene-propylene copolymers having
an ethylene content from about 2 to 10% by weight, preferably from about 5 to 8% by weight, or random propylene-1-butylene copolymers having
a butylene content from about 4 to 25% by weight, preferably from about 10 to 20% by weight, in each case based on the total weight of the copolymer, or random ethylene-propylene-1-butylene terpolymers having
an ethylene content from about 1 to 10% by weight, preferably from about 2 to 6% by weight, and
a 1-butylene content from about 3 to 20% by weight, preferably from about 8 to 10% by weight, in each case based on the total weight of the terpolymer, or a blend of an ethylene-propylene-1-butylene terpolymer and a propylene-1-butylene copolymer
having an ethylene content from about 0.1 to 7% by weight
and a propylene content from about 50 to 90% by weight
and a 1-butylene content from about 10 to 40% by weight, in each case based on the total weight of the polymer blend.

The propylene homopolymer employed as or in component I comprises predominantly (at least about 90%) propylene and has a melting point of about 140° C. or above, preferably from about 150° to 170° C. Isotactic homopolypropylene having an n-heptane-soluble content of about 6% by weight or less, based on the isotactic homopolypropylene is preferred. The homopolymer of component I or the homopolymer present therein generally has a melt flow index from about 0.5 g/10 min to 15 g/10 min, preferably from about 1.5 g/10 min to 6 g/10 min, at 230° C. and a force of 21.6N (DIN 53 735).

Component II of the outer layer mixture or blend essentially comprises an HDPE or a blend, essentially comprising HDPE as component A and a component B. For the purposes of the present invention, HDPE is taken to mean high-pressure polyethylenes which have the following properties:

1. The melt flow index (MFI), measured in accordance with DIN 53 735 or ISO 1133 at 50N/190° C., is in the range from about 0.2 to 50 g/10 min, preferably from about 1.5 to 45 g/10 min, more preferably from about 5 to 25 g/10 min.

2. The viscosity index, measured in accordance with DIN 53 728, Part 4, or ISO 1191, is in the range from about 100 to 450 cm$^3$/g, preferably from about 120 to 280 cm$^3$/g.

3. The crystallinity is from about 35 to 80%, preferably from about 50 to 80%.

4. The density, measured at 23° C. in accordance with DIN 53 479, Method A, or ISO 1183, is in the range from about 0.93 to 0.97 g/cm$^3$, preferably from about 0.95 to 0.96 g/cm$^3$.

5. The melting point, measured by a differential scanning calorimeter (DSC) (maximum of the melting curve, heating rate 20° C./min) is between about 120° and 150° C., preferably between about 125° and 135° C.

The HDPE as component II and HDPE as blend component A is selected from the above-described polyethylenes, so that the same HDPE as blend component A is in principle suitable as component II, but they need not be identical.

Blend component B preferably comprises a propylene homopolymer or a copolymer of
ethylene and propylene or
ethylene and butylene or
propylene and butylene or
ethylene and another α-olefin having 5 to 10 carbon atoms or
propylene and another α-olefin having 5 to 10 carbon atoms or a terpolymer of
ethylene and propylene and butylene or
ethylene and propylene and another α-olefin having 5 to 10 carbon atoms or a mixture of two or more of said homopolymers, copolymers and terpolymers or a blend of two or more of said homopolymers, copolymers and terpolymers.

In a preferred embodiment, blend component B advantageously comprises a propylene homopolymer or a copolymer of
ethylene and propylene or
ethylene and 1-butylene or
propylene and 1-butylene or a terpolymer of ethylene and propylene and 1-butylene or a mixture of two or more of said homopolymers, copolymers and terpolymers or a blend of two or more of said homopolymers, copolymers and terpolymers.

Particular preference is given to propylene homopolymers or random ethylene-propylene copolymers having an ethylene content from about 2 to 10% by weight, preferably from about 5 to 8% by weight, or random propylene-1-butylene copolymers having a butylene content from about 4 to 25% by weight, preferably from about 10 to 20% by weight, in each case based on the total weight of the copolymer, or random ethylene-propylene-1-butylene terpolymers having an ethylene content from about 1 to 10% by weight, preferably from about 2 to 6% by weight, and a 1-butylene content from about 3 to 20% by weight, preferably from about 8 to 10% by weight, in each case based on the total weight of the terpolymer, or a blend of an ethylene-propylene-1-butylene terpolymer and a propylene-1-butylene copolymer having an ethylene content from about 0.1 to 7% by weight and a propylene content from about 50 to 90% by weight and a 1-butylene content from about 10 to 40% by weight, in each case based on the total weight of the polymer blend.

The propylene homopolymer employed as or in blend component B comprises predominantly (at least about 90%) propylene and has a melting point of about 140° C. or above, preferably from about 150° to 170° C. Isotactic homopolypropylene having an n-heptane-soluble content of about 6% by weight or less, based on the isotactic homopolypropylene, is preferred. The homopolymer of blend component B or the homopolymer present therein generally has a melt flow index from about 0.5 g/10 min to 15 g/10 min, preferably from about 1.5 g/10 min to 6 g/10 min, at 230° C. and a force of 21.6N (DIN 53 735).

The weight ratio between the two blend components A and B is from about A:B=20:80 to about A:B=80:20, preferably from A:B=40:60 to A:B=60:40, more preferably about A:B=45:55.

The blend of components A and B has a melt flow index (DIN 53 735 at 230° C. and a load of 21.6N) from about 1.5 g/10 min to 12 g/10 min, preferably from about 2.5 g/10 min to 6 g/10 min. The melt flow index of the blend is preferably higher than that of the propylene polymer of the base layer. The melting range of the blend is between about 100° and 160° C., preferably between about 120° and 150° C.

The weight ratio between the two components I and II of the outer layer mixture or of the blend can vary within broad limits and depends on the intended application of the multilayer film. The ratio between components I and II is preferably in a range from about I:II=10:90 to I:II=90:10, preferably from about I:II=30:70 to I:II=70:30, more preferably about I:II=50:50.

The multilayer film according to the invention comprises at least the above-described resin-containing base layer and at least one matte outer layer which comprises the above-described mixture. Depending on its intended application, the multilayer film may have another outer layer on the opposite side. If desired, one or more interlayers may be applied between the base layer and the outer layer(s).

Preferred embodiments of the multilayer film have three layers. The structure, thickness and composition of a second outer layer can be selected independently of the first matte outer layer which is already present. The second outer layer can comprise one of the above-described mixtures or blends of the present invention, which is not necessarily identical to that of the first outer layer. However, the second outer layer may also comprise any other conventional outer layer polymer.

The thickness of the outer layer(s) is greater than about 0.3 μm, preferably in the range from about 0.8 to 10 μm, more preferably from about 1 to 5 μm. The outer layers on both sides can have identical or different thicknesses.

The overall thickness of the multilayer polyolefin film according to the present invention can vary within broad limits and depends on the intended use. It is preferably from about 5 to 100 μm, more preferably from about 10 to 80 μm, with the base layer making up from about 50 to 95% of the overall film thickness. The density of the film is generally about 0.9 g/cm$^2$ or above, preferably in the range from about 0.9 to 0.95g/cm$^2$.

In order to improve the adhesion properties of the outer layer(s), at least one surface of the film may be corona- or flame-treated. If desired, the corresponding treatment can be carried out on both surfaces and can be identical or different.

In order to further improve specific properties of the polyolefin film according to the present invention, both the base layer and the outer layer(s) may further contain effective amounts of additives. Preferred additives are antistatics and/or antiblocking agents and/or lubricants and/or stabilizers and/or neutralizers, which are compatible with the propylene polymers of the base layer and of the outer layer(s), with the exception of the antiblocking agents which are generally incompatible. All amount data hereinafter in percent by weight (% by weight) and in each case relate to the layer or layers to which the additive can be added.

Preferred antistatics are alkali metal alkanesulfonates, polyether-modified, i.e. ethoxylated and/or propoxylated polydiorganosiloxanes (polydialkylsiloxanes, polyalkylphenylsiloxanes and the like) and/or essentially straight-chain and saturated aliphatic, tertiary amines containing an aliphatic radical having 10 to 20 carbon atoms which are substituted by ω-hydroxy-($C_1$–$C_4$) alkyl groups. N,N-bis(2-hydroxyethyl)alkylamines having 10 to 20 carbon atoms, preferably 12 to 18 carbon atoms, in the alkyl radical are particularly suitable. The effective amount of antistatic is in the range from about 0.05 to 0.3% by weight. Glycerol monostearate is also preferably employed as antistatic, in an amount from about 0.03% to 0.2%.

Suitable antiblocking agents are inorganic additives such as silicon dioxide, calcium carbonate, magnesium silicate, aluminum silicate, calcium phosphate and the like and/or incompatible organic polymers such as polyamides, polyesters, polycarbonates and the like. Preference is given to benzoguanamine-formaldehyde polymers, silicon dioxide and calcium carbonate. The effective amount of antiblocking agent is in the range from about 0.1 to 2% by weight, preferably from about 0.1 to 0.5% by weight. The mean particle size is between about 1 and 6 μm, preferably about 2 and 5 μm. Particularly suitable particles having a spherical shape, are described in EP-A-0 236 945 and DE-A-38 01 535, the disclosures of which are hereby incorporated by reference. The antiblocking agents are preferably added to the outer layers.

Lubricants are higher aliphatic acid amides, higher aliphatic acid esters, waxes and metal soaps and polydimethylsiloxanes. The effective amount of lubricant is in the range from about 0.01 to 3% by weight, preferably from about 0.05 to 1% by weight. Particularly suitable is the addition of higher aliphatic acid amides in the range from about 0.01 to 0.25% by weight in the base layer and/or the outer layers. A particularly suitable aliphatic acid amide is erucamide. The addition of polydimethylsiloxanes is preferably in the range from about 0.05 to 2.0% by weight. Polydimethylsiloxanes having a viscosity from about 10,000 to 1,000,000 mm$^2$/s are especially preferred. Particularly favorable is the addition of polydimethylsiloxanes in one or both outer layers.

Stabilizers which can be employed are conventional compounds which have a stabilizing action for polymers of ethylene, propylene and other α-olefins. Their added amount is between about 0.05 and 2% by weight. Particularly suitable are phenolic stabilizers, alkali metal or alkaline earth metal stearates and/or alkali metal or alkaline earth metal carbonates.

Phenolic stabilizers are preferred in an amount from about 0.1 to 0.6% by weight, preferably from about 0.15 to 0.3% by weight, and have a molecular weight of greater than about 500 g/mol. Pentaerythrityl tetrakis[3-(3,5-di-tert-butyl-4-hydroxyphenyl)propionate] and 1,3,5-trimethyl-2,4,6-tris(3,5-di-tert-butyl-4-hydroxybenzyl)benzene are particularly advantageous.

Neutralizers are preferably calcium stearate and/or calcium carbonate and/or synthetic dihydrotalcite (SHYT) having a mean particle size of at most about 0.7 μm, an absolute particle size of less than about 10 μm and a specific surface area of at least about 40 m$^2$/g.

Another aspect of the present invention relates to a process for the production of the multilayer film according to the present invention by the coextrusion process, which is known per se. This process is carried out by coextruding the melts corresponding to the individual layers of the film through a flat-film die, taking off the resultant film over one or more rolls for solidification, subsequently biaxially stretching (orienting) the film, heat-setting the biaxially stretched film and, if desired, corona- or flame-treating the surface layer intended for treatment.

The biaxial stretching (orientation) is generally carried out consecutively. Consecutive biaxial stretching, in which stretching is carried out first longitudinally (i.e., in the machine direction) and then transversely (i.e., perpendicular to the machine direction), is preferred.

As is conventional in coextrusion, the polymer or polymer mixture of the individual layers is compressed and liquified in an extruder, with it being possible for any additives to be already present in the polymer or polymer mixture or added at this time. In particular, the resins are preferably added in the form of a masterbatch. The melts are then extruded simultaneously through a flat-film die (slot die), and the extruded multilayer film is drawn off over one or more take-off rolls, where it cools and solidifies.

The resultant film is then stretched longitudinally and transversely to the extrusion direction, which results in alignment of the molecule chains. According to the present invention, the conditions in the longitudinal and transverse directions are selected so that the film has approximately balanced orientation in the longitudinal and transverse directions and has substantially isotropic mechanical properties. For example, the ratio between the permanent set or tear strength in the transverse direction and the permanent set or tear strength in the longitudinal direction is at most about 2.0. The prerequisites for achieving very good twist properties are then particularly favorable. It has furthermore been found that the more the film has been stretched in the longitudinal direction the better the twist properties are. The longitudinal stretching ratios according to the present invention are from about 5.5 to 9, preferably from about 6 to 8. The transverse stretching ratios should also be selected accordingly. The preferred range here for the transverse stretching also is from about 6 to 8. Unlike other packaging films, the film is advantageously not highly stretched in the transverse direction. For example, the use of a longitudinal stretching ratio of λ=5 and a transverse stretching ratio of λ=10, gives a film having comparatively poor twist properties, even in the case of addition of large amounts of resin. In order to achieve the twist properties essential to the present invention, a ratio between the stretching ratios in the transverse and longitudinal directions of less than about 2, preferably less than about 1.5, should be provided. This ratio is particularly preferably in the range of about 0.5 to 1.5. The longitudinal stretching is expediently carried out with the aid of two rolls running at different speeds corresponding to the desired stretching ratio. The transverse stretching is expediently carried out with the aid of an appropriate tenter frame.

Biaxial stretching of the film is followed by heat-setting (heat treatment). The film is kept at a temperature of about 140° to 160° C. for about 0.5 to 10 seconds. The film is subsequently wound up in the conventional manner by means of a wind-up unit.

It has proven particularly advantageous to keep the take-off roll or rolls at a temperature of about 20° to 100° C., preferably from about 40° to 90° C., by means of a heating and cooling circuit. This serves the purpose of cooling and solidifying the extruded film.

The temperatures at which longitudinal and transverse stretching are carried out can vary in a relatively broad range and depend on the respective composition of the outer layer mixture and on the desired properties of the film. In general, the longitudinal stretching is preferably carried out from about 90° to 170° C. and the transverse stretching preferably from about 120° to 150° C.

If desired, one or both surfaces of the film can, as mentioned above, be corona- or flame-treated by one of the known methods after the biaxial stretching. The treatment intensity is generally in the range from about 37 to 45 mN/m, preferably from about 39 to 40 mN/m.

In the case of corona treatment an advantageous procedure is to pass the film between two conductor elements serving as electrodes. A high voltage, usually alternating voltage (from about 5 to 20 kV and from about 5 to 30 kHz), is applied between the electrodes so that spray or corona discharges can occur. The spray or corona discharge ionizes the air above the film surface and reacts with the molecules of the film surface, causing formation of polar inclusions in the essentially non-polar polymer matrix.

For flame treatment with a polarized flame (see U.S. Pat. No. 4,622,237), a direct electric voltage is applied between a burner (negative pole) and a chill roll. The level of the applied voltage is between about 500 and 3,000 V, preferably in the range from about 1,500 to 2,000 V. The applied voltage gives the ionized atoms increased acceleration, and they hit the polymer surface with greater kinetic energy. The chemical bonds within the polymer molecule are more easily broken, and formation of free radicals proceeds more rapidly. Heating of the polymer using this procedure is substantially less than in the case of standard flame treatment, and films can be obtained in which the heat-sealing properties of the treated side are even better than those of the untreated side.

The multilayer film according to the present invention is distinguished by a very homogeneous and characteristic matte appearance and excellent scratch resistance.

It has been found that incorporation of the above-described polyethylenes into a propylene homopolymer, propylene copolymer or propylene terpolymer outer layer surprisingly provides the very homogeneous film appearance and the desired matte characteristics.

The optimized matte surface gives the film a paper-like appearance which is particularly desirable for certain applications in the packaging sector. Surprisingly, it has been found that it is not just the minimization of sheen that brings the desired optical effect. Instead, a balanced optimization of the properties is necessary, which is surprisingly possible, by means of the specific outer layer composition of the present invention.

The requirement for a "matte appearance" is achieved particularly well if the sheen values of the film are less than about 80 (ASTM-D 523-78), preferably in the range from about 10 to 65 (measurement angle 85°), and the haze (measured in accordance with ASTM-D 1003) is in the range from about 10 to 80, preferably about 30 to 70.

The multilayer film according to the present invention has excellent printability and a particularly uniform, flaw-free print appearance. The colors are clear and not foggy. No spots or other flaws appear, even in the printed film. The surface tension is surprisingly high and only drops insignificantly upon storage, even after storage for a number of months.

It has been found that incorporation of resin into the base layer of the film having the outer layer according to the present invention has advantageous effects on the film properties. In particular, the resin contributes to a very uniform appearance of the film, surprisingly without impairing the matte appearance. This was particularly surprising since the teaching of the known art recommends the addition of resin in order to increase the sheen. Additionally, the resin considerably improves the scratch resistance of the outer layer. This effect on the specific outer-layer composition of the present invention was unforeseeable and not readily expected.

The film is also distinguished by excellent twist properties. The twist properties of the film can be amply described by two physical parameters of the film. The twist properties are optimized: the larger the permanent set in both the longitudinal ($D_l$) and transverse ($D_t$) directions (for the measurement method see the examples); and the smaller the elongation at tearing in the longitudinal direction. The values of the above physical parameters should be approximately equal in the two directions. The ratio between the values for the permanent set $D_l:D_t$ is generally less than about 2, preferably in the range from about 0.5 to 1.5, more preferably in the range from about 0.7 to 1.3. The values for elongation at tearing also form corresponding ratios in the transverse and longitudinal directions.

Good twist properties arise if the permanent set values for both directions are greater than about 50%, preferably in the range from about 50 to 70%.

The elongation at tearing is, like the modulus of elasticity and the tear strength, determined in accordance with DIN 53 455. The films according to the invention have elongation at tearing values in both directions of less than about 120%, preferably less than about 100%.

In summary, it should be noted that the multilayer film according to the invention is distinguished by a multiplicity of advantageous properties. The advantageous properties include:

a characteristic matte sheen of less than 80 at a measurement angle of 85° (ASTM-D-523-78), very good printability, a particularly uniform film appearance, excellent scratch resistance, and very good twist properties.

This surprising multiplicity of excellent properties provides according to the present invention a film which is highly suitable for the intended use as a twist wrapping film.

The invention is now described in greater detail with reference to working examples as shown in Table 1 below.

In the following examples, $C_2$ is defined as ethylene, $C_3$ is defined as propylene and $C_4$ is defined as butylene.

TABLE 1

|     | Component I | Component II | I:II |
| --- | --- | --- | --- |
| E1  | $C_3$-homopolymer | HDPE + $C_3$-homopolymer | 50:50 |
| E2  | $C_2/C_3$-copolymer | HDPE + $C_3$-homopolymer | 50:50 |
| E3  | $C_2/C_3$-copolymer | HDPE + $C_3$-homopolymer | 70:30 |
| E4  | $C_2/C_3/C_4$-terpolymer + $C_3/C_4$-copolymer | HDPE + $C_2/C_3$-copolymer | 60:40 |
| E5  | $C_2/C_3$-copolymer | HDPE + $C_2/C_3$-copolymer | 50:50 |
| E6  | $C_2/C_3$-copolymer | HDPE + $C_2/C_3$-copolymer | 70:30 |
| E7  | $C_2/C_3$-copolymer | HDPE + $C_2/C_3/C_4$-terpolymer | 50:50 |
| E8  | $C_2/C_3$-copolymer | HDPE + $C_2/C_3/C_4$-terpolymer | 70:30 |
| E9  | $C_2/C_3$-copolymer | HDPE + $C_2/C_3/C_4$-terpolymer + $C_3/C_4$-copolymer | 50:50 |
| E10 | $C_2/C_3/C_4$-terpolymer | HDPE + $C_2/C_3/C_4$-terpolymer + $C_3/C_4$-copolymer | 50:50 |
| E11 | $C_2/C_3/C_4$-terpolymer | HDPE + $C_2/C_3/C_4$-terpolymer | 50:50 |
| E12 | $C_3$-homopolymer | HDPE | 50:50 |
| E13 | $C_2/C_3$-copolymer | HDPE | 50:50 |
| E14 | $C_2/C_3$-copolymer | HDPE | 70:30 |
| E15 | $C_2/C_3/C_4$-terpolymer | HDPE | 50:50 |
| E16 | $C_2/C_3/C_4$-terpolymer | HDPE | 70:30 |

E = Example

EXAMPLE 1

A three-layer film with a thickness of 1 mm and the layer structure XZX, i.e. the base layer Z was surrounded by two identical outer layers X, was extruded by the coextrusion process from a flat-film die at an extrusion temperature of 220° C.

The base layer comprised a mixture of propylene homopolymer having an n-heptane-soluble content of 4.5% by weight and a melting point of 165° C. and a hydrocarbon resin (a cyclopentadiene resin) having a softening point of 140° C. The resin content in the base layer was 30%. The resin used was from Exxon (ECR 356) in the form of a 50% masterbatch. The name of the resin batch was Exxelor® PA 609. The melt flow index of the propylene homopolymer was 3.2 g/10 min at 230° C. and a load of 21.6N (DIN 53 735). In addition the base layer contained 0.15% by weight of an N,N-bis(hydroxyethyl)($C_{10}$– $C_{20}$)alkylamine (Armostat® 300) and 0.1% by weight of erucamide.

The two outer layers X essentially comprised a mechanical mixture of components I and II in the ratio of I:II=50:50. Component I comprised a propylene homopolymer having an n-heptane-soluble content of 4.5% by weight and a melting point of 165° C. The melt flow index of the propylene homopolymer was 6.0 g/10 min at 230° C. and a load of 21.6N (DIN 53 735).

Component II comprised a blend of two components A and B in the ratio A:B=50:50. Component A comprised an HDPE having an MFI (50N/190° C.) of 11 g/10 min (measured in accordance with DIN 53 735), a viscosity index of 160 $cm^3$/g (measured in accordance with DIN 53 728, Part 4), a density of 0.954 g/$cm^3$ (measured in accordance with DIN 53 479, Method A), a degree of crystallization of 68% and a melting point of 132° C., measured by DSC. Component B comprised a propylene homopolymer having an n-heptane-soluble content of 4.5% by weight and a melting point of 165° C. The melt flow index of component B was 7.0 g/10 min at 230° C. and a load of 21.6N (DIN 53 735).

Components I and II were mixed mechanically in a Henschel mixer for 2 minutes at 500 rpm, in the ratio I:II=50:50 giving a homogeneous granule mixture.

All layers contained 0.12% by weight of pentaerythrityl tetrakis[4-(3,5-di-tert-butyl-4-hydroxyphenyl)propionate (Irganox® 1010) as stabilizer and 0.06% by weight of calcium stearate as neutralizer.

After coextrusion, the extruded three-layer film was taken off over the corresponding process steps via a take-off roll and cooled. The film was subsequently stretched longitudinally and stretched transversely. After stretching, the film was set and corona-treated. The following conditions, in detail, were selected:

Extrusion:
  Extrusion temperature 220° C.
  Take-off roll temperature 40° C.
Longitudinal stretching:
  Stretching roll T=110° C.
  Longitudinal stretching by a factor of 6.5
Transverse stretching:
  Heat-up zones T=150° C.
  Stretching zones T=150° C.
  Transverse stretching by a factor of 7.5
Setting:
  Temperature T=110° C.
Corona treatment:
  Voltage: 10,000 V
  Frequency: 10,000 Hz The multilayer film produced in this way had a matte surface on both sides and had a surface tension of from 40 to 41 mN/m directly after production.

The film had virtually isotropic orientation and had excellent twist properties. In addition, the film was very scratch resistant. The film had a thickness of about 21 μm, with the base layer having a thickness of 19 μm and each outer layer having a thickness of 100 μm.

EXAMPLE 2

Example 1 was repeated with the following changes. Component I comprised a random ethylene-propylene copolymer having an ethylene content of 5% by weight, based on the weight of the copolymer. The melting point of the copolymer was 134° C., and the melt flow index was 7.0 g/10 min.

EXAMPLE 3

Example 2 was repeated with the following changes. The mixing ratio between the two components I and II was I:II=70:30.

EXAMPLE 4

Example 1 was repeated with the following changes. Component I comprised a polymer blend of an ethylene-propylene-1-butylene terpolymer and a propylene-1-butylene copolymer, corresponding to a content of 0.7% by weight of ethylene, 81.3% by weight of propylene and 18% by weight of butylene, based on the polymer blend.

Component II comprised a blend of two components A and B in the ratio A:B=50:50. Component A comprised an HDPE having an MFI (50N/190° C.) of 11 g/10 min (measured in accordance with DIN 53 735), a viscosity index of 160 $cm^3$/g (measured in accordance with DIN 53 728, Part 4), a density of 0.954 g/$cm^3$ (measured in accordance with DIN 53 479, Method A), a degree of crystallization of 68% and a melting point of 132° C., measured by DSC. Component B comprised a random ethylene-propylene copolymer having an ethylene content of 5% by weight, based on the weight of the copolymer. The melting point of the copolymer was 134° C. and the melt flow index was 7.0 g/10 min.

The mixing ratio between the two components I and II was I:II=60:40.

EXAMPLE 5

Example 4 was repeated with the following changes. Component I comprised a random ethylene-propylene copolymer having an ethylene content of 5% by weight, based on the weight of the copolymer. The melting point of the copolymer was 134° C. and the melt flow index was 7.0 g/10 min.

The mixing ratio between the two components I and II was I:II=50:50.

EXAMPLE 6

Example 5 was repeated with the following changes. The mixing ratio between the two components I and II was I:II=70:30.

EXAMPLE 7

Example 5 was repeated with the following changes. Component II comprised a blend of two components A and B in the ratio A:B=50:50. Component A comprised an HDPE having an MFI (50N/190° C.) of 11 g/10 min (measured in accordance with DIN 53 735), a viscosity index of 160 $cm^3$/g (measured in accordance with DIN 53 728, Part 4), a density of 0.954 g/$cm^3$ (measured in accordance with DIN 53 479, Method A), a degree of crystallization of 68% and a melting point of 132° C., measured by DSC. Component B comprised a terpolymer of ethylene, propylene and 1-butylene units, having an ethylene content of 1.9% by weight and a 1-butylene content of 8.4% by weight, based on the terpolymer.

EXAMPLE 8

Example 7 was repeated with the following changes. The mixing ratio between the two components I and II was I:II=70:30.

EXAMPLE 9

Example 5 was repeated with the following changes. Component II comprised a blend of two components A and B in the ratio A:B=50:50. Component A comprised an HDPE having an MFI (50N/190° C.) of 11 g/10 min (measured in accordance with DIN 53 735), a viscosity index of 160 cm$^3$/g (measured in accordance with DIN 53 728, Part 4), a density of 0.954 g/cm$^3$ (measured in accordance with DIN 53 479, Method A), a degree of crystallization of 68% and a melting point of 132° C., measured by DSC. Component B comprised a polymer blend of an ethylene-propylene-1-butylene terpolymer and a propylene-1-butylene copolymer, corresponding to a content of 0.7% by weight of ethylene, 81.3% by weight of propylene and 18% by weight of butylene, based on the polymer blend.

EXAMPLE 10

Example 9 was repeated with the following changes. Component I comprised a terpolymer of ethylene, propylene and 1-butylene units, having an ethylene content of 1.9% by weight and a 1-butylene content of 8.4% by weight, based on the terpolymer.

EXAMPLE 11

Example 7 was repeated with the following changes. Component I comprised a terpolymer of ethylene, propylene and 1-butylene units, having an ethylene content of 1.9% by weight and a 1-butylene content of 8.4% by weight, based on the terpolymer.

EXAMPLE 12

Example 1 was repeated with the following changes. Component II comprised a pure HDPE having an MFI (50N/190° C.) of 11 g/10 min (measured in accordance with DIN 53 735), a viscosity index of 160 cm$^3$/g (measured in accordance with DIN 53 728, Part 4), a density of 0.954 g/cm$^3$ (measured in accordance with DIN 53 479, Method A), a degree of crystallization of 68% and a melting point of 132° C., measured by DSC.

EXAMPLE 13

Example 2 was repeated with the following changes. Component II corresponded to that of Example 12.

EXAMPLE 14

Example 3 was repeated with the following changes. Component II corresponded to that of Example 12.

EXAMPLE 15

Example 11 was repeated with the following changes. Component II corresponded to that of Example 12.

EXAMPLE 16

Example 15 was repeated with the following changes. The mixing ratio between the two components I and II was I:II=70:30.

The raw materials and films were characterized using the following measurement methods:

Melt flow index

The melt flow index was measured in accordance with DIN 53 735 at a load of 21.6N and 230° C. or at a load of 50N and 190° C.

Melting point

DSC measurement, maximum of the melting curve, heating rate 20° C./min.

Viscosity index J

The viscosity index is a measure of the molecular weight. The viscosity index is measured in accordance with DIN 53 728, Part 4, in 0.1% strength decahydronaphthalene solution at 135° C.

Density σ

The density is determined in accordance with DIN 53 479, Method A.

Degree of crystallization α

The degree of crystallization can be determined from the following equation:

$$\alpha = \frac{\rho - \rho_{amorphous}}{\rho_{crystalline} - \rho_{amorphous}} \cdot 100\%$$

where $\rho_{amorphous}$=0.8549 g/cm$^3$ $\rho_{crystalline}$=1.0005 g/cm$^3$ $\rho$=density of the HDPE grade employed Haze The haze of the film was measured in accordance with ASTM-D 1003-52.

Sheen

The sheen was determined in accordance with DIN 67 530. The reflection value was measured as an optical parameter for the surface of a film. In accordance with the standards ASTM-D 523-78 and ISO 2813, the angle of incidence was set at 60° or 85°. A light beam hits the planar test surface at the set angle of incidence and is reflected or scattered thereby. The light beams incident on the photoelectronic receiver are indicated as a proportional electrical quantity. The measurement value is dimensionless and must be specified together with the angle of incidence.

Roughness

The roughness was determined in accordance with DIN 4768.

Friction

The friction was determined in accordance with DIN 53 375.

Surface tension

The surface tension was determined by the ink method (DIN 53 364).

Printability

The corona-treated films were printed 14 days after production (short-term assessment) and 6 months after production (long-term assessment). The ink adhesion was assessed by an adhesive-tape test. If a small amount of ink was removable by means of an adhesive tape, the ink adhesion was assessed as being moderate, and if a significant amount of ink was removable, it was assessed as being poor.

Determination of the permanent set

A 15 mm wide strip was cut out of the film perpendicular to the machine direction and clamped in a tensile testing machine, the distance between the clamps being 200 mm. The sample was then stretched at 20 mm/min, corresponding to 10%/min. After an elongation of 10%, i.e. at a sample length of 220 mm, the sample was automatically relaxed at the same rate. The permanent set is calculated from $$D = \frac{X\%}{10\%} \cdot 100\%$$

Scratch resistance or scratch sensitivity

The scratch resistance is determined in accordance with DIN 53 754.

The scratch resistance is determined using a Taber 503 Abraser abrasion tester from Teledyne Taber, with Calibrade R H18 friction wheels loaded with 250 g. The scratch resistance or scratch sensitivity is taken to mean the increase in haze of the scratched film compared with the original film after 50 revolutions of the sample plate. The scratch resistance is scored very good (++) if the increase in haze is less than 22%, good (+) if the increase in haze is from 22 to 25%, moderate (±) if the increase in haze is from 25 to 30%, and poor (−) if the increase in haze is greater than 30%.

Table 2 below shows the properties of the polypropylene films of the examples.

TABLE 2

| Ex. | Sheen (ASTM D-523-78) Measurement angle 85° | Haze (ASTM 1003) % | Roughness (c.o. 0.25 mm) μm | Coefficient of friction — | Surface tension after storage for 6 months mN/m | Visual assessment of the matte appearance (++ = very good) | Permanent set % long. | Permanent set % transv. | Scratch resistance Δ haze |
|---|---|---|---|---|---|---|---|---|---|
| E1  | 40 | 60 | 2.5 | 0.5 | 38 | ++ | 63 | 62 | 22 |
| E2  | 32 | 66 | 3.0 | 0.4 | 39 | ++ | 63 | 61 | 20 |
| E3  | 42 | 58 | 2.3 | 0.5 | 38 | ++ | 64 | 61 | 20 |
| E4  | 38 | 62 | 2.6 | 0.4 | 39 | ++ | 63 | 62 | 20 |
| E5  | 30 | 68 | 3.2 | 0.3 | 39 | ++ | 62 | 60 | 20 |
| E6  | 38 | 63 | 2.6 | 0.4 | 39 | ++ | 63 | 62 | 20 |
| E7  | 32 | 65 | 2.9 | 0.4 | 39 | ++ | 63 | 63 | 20 |
| E8  | 38 | 62 | 2.7 | 0.4 | 39 | ++ | 62 | 62 | 20 |
| E9  | 34 | 63 | 3.3 | 0.4 | 39 | ++ | 64 | 62 | 20 |
| E10 | 36 | 62 | 2.6 | 0.4 | 39 | ++ | 63 | 61 | 20 |
| E11 | 35 | 62 | 2.6 | 0.4 | 39 | ++ | 64 | 60 | 20 |
| E12 | 31 | 68 | 3.0 | 0.4 | 39 | ++ | 65 | 60 | 20 |
| E13 | 29 | 70 | 3.2 | 0.3 | 38 | ++ | 64 | 61 | 20 |
| E14 | 32 | 66 | 2.8 | 0.3 | 39 | ++ | 62 | 60 | 20 |
| E15 | 30 | 68 | 3.0 | 0.3 | 39 | ++ | 63 | 61 | 20 |
| E16 | 34 | 64 | 2.8 | 0.4 | 39 | ++ | 64 | 60 | 20 |

What is claimed is:

1. A multilayer polypropylene film having at least one matte surface, comprising: at least one base layer which comprises a propylene polymer and a hydrocarbon resin; and at least one outer layer which comprises a mixture or a blend of two components I and II, wherein component I is selected from the group consisting of a propylene homopolymer,
a copolymer of ethylene and propylene,
a copolymer of ethylene and butylene,
a copolymer of propylene and butylene,
a copolymer of ethylene and another α-olefin having 5 to 10 carbon atoms,
a copolymer of propylene and another α-olefin having 5 to 10 carbon atoms,
a terpolymer of ethylene and propylene and butylene,
a terpolymer of ethylene and propylene and another α-olefin having 5 to 10 carbon atoms,
mixtures or blends thereof, and
a blend of two or more of said homopolymers, copolymers and terpolymers, mixed with one or more of said homopolymers, copolymers and terpolymers, and component II is selected from the group consisting of an HDPE and a blend of two components A and B, where blend component A is essentially
an HDPE and
blend component B is selected from the group consisting of
a propylene homopolymer,
a copolymer of ethylene and propylene,
a copolymer of ethylene and butylene,
a copolymer of propylene and butylene,
a copolymer of ethylene and another α-olefin having 5 to 10 carbon atoms,
a copolymer of propylene and another α-olefin having 5 to 10 carbon atoms,
a terpolymer of ethylene and propylene and butylene,
a terpolymer of ethylene and propylene and another α-olefin having 5 to 10 carbon atoms, and
mixtures or blends thereof.

2. A multilayer polypropylene film as claimed in claim 1, wherein component I is selected from the group consisting of
a propylene homopolymer,
a copolymer of ethylene and propylene,
a copolymer of ethylene and 1-butylene,
a copolymer of propylene and 1-butylene,
a terpolymer of ethylene and propylene and 1-butylene,
mixtures or blends thereof, and
a blend of two or more of said homopolymers, copolymers and terpolymers, mixed with one or more of said homopolymers, copolymers and terpolymers, and blend component B is selected from the group consisting of
a propylene homopolymer,
a copolymer of ethylene and propylene,
a copolymer of ethylene and 1-butylene,
a copolymer of propylene and 1-butylene,
a terpolymer of ethylene and propylene and 1-butylene, and
mixtures or blends thereof.

3. A multilayer film as claimed in claim 2, wherein component I is selected from the group consisting of propylene homopolymers, random ethylene-propylene copolymers having an ethylene content from about 2 to 10% by weight, random propylene-1-butylene copolymers having
a butylene content from about 4 to 25% by weight,
in each case based on the total weight of the copolymer, random ethylene-propylene-1-butylene terpolymers having
an ethylene content from about 1 to 10% by weight, and
a 1-butylene content from about 3 to 20% by weight,
in each case based on the total weight of the terpolymer, and a blend of an ethylene-propylene-1-butylene terpolymer and a propylene-1-butylene copolymer
having an ethylene content from about 0.1 to 7% by weight
and a propylene content from about 50 to 90% by weight
and a 1-butylene content from about 10 to 40% by weight,
in each case based on the total weight of the polymer blend, and blend component B is selected from the group consisting of
propylene homopolymers, random ethylene-propylene copolymers having
an ethylene content from about 2 to 10% by weight, random propylene-1-butylene copolymers having
a butylene content from about 4 to 25% by weight, in each case based on the total weight of the copolymer, random ethylene-propylene-1-butylene terpolymers having
an ethylene content from about 1 to 10% by weight, and
a 1-butylene content from about 3 to 20% by weight,
in each case based on the total weight of the terpolymer, and a blend of an ethylene-propylene-1-butylene terpolymer and a propylene-1-butylene copolymer
having an ethylene content from about 0.1 to 7% by weight
and a propylene content from about 50 to 90% by weight
and a 1-butylene content from about 10 to 40% by weight,
in each case based on the total weight of the polymer blend.

4. A multilayer polypropylene film as claimed in claim 1, wherein the HDPE has an MFI from about 0.2 to 50 g/10 min, a viscosity index from about 100 to 450 cm$^3$/g, a density from about 0.93 to 0.97 g/cm$^3$, a degree of crystallization from about 35 to 80% and a melting point of about 120° to 150° C.

5. A multilayer polypropylene film as claimed in claim 1, wherein the ratio between blend components A and B is in the range from about A:B=20:80 to A:B=80:20.

6. A multilayer polypropylene film as claimed in claim 1, wherein the blend of components A and B has a melt flow index from about 1.5 to 12 g/10 min.

7. A multilayer polypropylene film as claimed in claim 1, wherein the ratio between components I and II is in the range from about I:II=90:10 to I:II=10:90.

8. A multilayer polypropylene film as claimed in claim 1, wherein the propylene polymer of the base layer has a melting point of at least about 140° C. and the melt flow index is in the range from about 0.5 to 15 g/10 min.

9. A multilayer polypropylene film as claimed in claim 1, wherein the resin has a softening point from about 80° to 180° C.

10. A multilayer polypropylene film as claimed in claim 9, wherein the resin has a softening point from about 120° to 160° C.

11. A multilayer polypropylene film as claimed in claim 1, wherein the resin is added to the base layer in an amount from about 5 to 40% by weight based on the weight of the base layer.

12. A multilayer polypropylene film as claimed in claim 11, wherein the resin is added to the base layer in an amount from about 10 to 35% by weight.

13. A multilayer polypropylene film as claimed in claim 1, wherein the multilayer film has a permanent set of greater than about 50%, in both the longitudinal and transverse directions.

14. A multilayer polypropylene film as claimed in claim 13, wherein the film has a permanent set in the range from about 50 to 70%.

15. A multilayer polypropylene film as claimed in claim 1, wherein the multilayer film has approximately isotropic mechanical properties.

16. A packaged article comprising the multilayer film as claimed in claim 1, surrounding at least in part an article.

17. A multilayer polypropylene film as claimed in claim 1, produced by the process comprising the steps of:
coextruding the melts corresponding to the individual layers of the film through a flat-film die,
taking the coextruded film off over a take-off roll whose temperature is between about 40° and 100° C.,
biaxially stretching the film at a longitudinal stretching ratio of about 5.5:1 to 9:1 and a transverse stretching ratio of about 6:1 to 8:1,
heat-setting the biaxially stretched film, and subsequently winding the film up.

18. A multilayer polypropylene film as claimed in claim 17, further comprising the step of corona treating the film.

19. A multilayer polypropylene film as claimed in claim 17, wherein the longitudinal stretching of the film is carried out from about 120° to 150° C. and the transverse stretching is carried out from about 155° to 190° C.

20. A multilayer polypropylene film as claimed in claim 17, wherein the film is stretched such that it has an approximately balanced orientation.

* * * * *